US011976685B2

(12) United States Patent
McGrath et al.

(10) Patent No.: US 11,976,685 B2
(45) Date of Patent: May 7, 2024

(54) CONNECTOR

(71) Applicant: Quantum3 Aluminium Limited, Killaloe (IE)

(72) Inventors: Paul McGrath, Naas (IE); Arthur Middleton, Ballymore Eustace (IE)

(73) Assignee: Quantum3 Aluminium Limited, Killaloe (IE)

( * ) Notice: Subject to any disclaimer, the term of this patent is extended or adjusted under 35 U.S.C. 154(b) by 56 days.

(21) Appl. No.: 17/160,810

(22) Filed: Jan. 28, 2021

(65) Prior Publication Data
US 2021/0231148 A1 Jul. 29, 2021

(30) Foreign Application Priority Data
Jan. 28, 2020 (GB) ...................................... 2001159

(51) Int. Cl.
*F16B 7/18* (2006.01)
(52) U.S. Cl.
CPC ........ *F16B 7/187* (2013.01); *F16B 2200/403* (2018.08)
(58) Field of Classification Search
CPC .. F16B 7/044; F16B 7/048; F16B 7/18; F16B 7/187; F16B 2200/40; F16B 2200/403
See application file for complete search history.

(56) References Cited
U.S. PATENT DOCUMENTS
3,879,017 A * 4/1975 Maxcy .................. E04F 11/181
256/22

5,481,842 A * 1/1996 Gautreau .................. E04B 2/76
403/231
(Continued)

FOREIGN PATENT DOCUMENTS
CA 1317435 C 5/1993
DE 92 05 124 * 10/1992 ................ F16B 7/00
(Continued)

OTHER PUBLICATIONS
Search Report under Section 17 issued by the UK Intellectual Property Office under Application No. GB2001159.9, dated Jul. 16, 2020, 1 page.
(Continued)

*Primary Examiner* — Michael P Ferguson
(74) *Attorney, Agent, or Firm* — Michael Crilly, Esquire

(57) ABSTRACT

A connector for attachment of two frame elements in a framing system has a connector body of similar rectangular section to the frame elements. A flat inner engagement face of the connector body engages with a flat end face of a first frame element, and essentially forms an extension of the first frame element. An outer engagement face of the connector body is substantially parallel to the inner engagement face and in use abuts against a flat side wall of a second frame element. The outer engagement face has two outwardly projecting lips along opposite side edges of the connector body at the outer face. Each lip has a curved inner face for engagement with opposed radiused edges at opposite sides of the flat side wall face of the second frame element. A flat outer face of the lip forms an extension of a side wall of the connector body and provides a smooth transition between adjacent side walls of the two frame elements. Thus, advantageously, there is no groove forming a dirt trap between the two frame elements when they are interconnected.

9 Claims, 14 Drawing Sheets

(56) References Cited

U.S. PATENT DOCUMENTS

| | | | | |
|---|---|---|---|---|
| 5,651,630 A | * | 7/1997 | Nomura | F16B 7/187 403/219 |
| 5,729,948 A | * | 3/1998 | Levy | E04B 1/2604 297/440.22 |
| 5,746,535 A | * | 5/1998 | Kohler | F16B 37/046 403/258 |
| 6,712,543 B1 | * | 3/2004 | Schmalzhofer | F16B 7/187 403/258 |
| 7,004,667 B2 | * | 2/2006 | Ludwig | E04B 9/14 403/231 |
| 2004/0033103 A1 | | 2/2004 | Ludwig et al. | |

FOREIGN PATENT DOCUMENTS

| | | | | |
|---|---|---|---|---|
| DE | 4244396 A1 | | 6/1994 | |
| DE | 20 2017 006 175 | * | 1/2018 | F16B 7/18 |
| EP | 0716193 A1 | | 6/1996 | |
| EP | 2944832 A1 | | 11/2015 | |
| WO | 2009/153273 A1 | | 12/2009 | |

OTHER PUBLICATIONS

European Search Report, Application No. EP21154128, dated Jun. 1, 2021. (2 pages).

European Search Opinion, Application No. EP21154128, dated Jun. 1, 2021. (3 pages).

\* cited by examiner

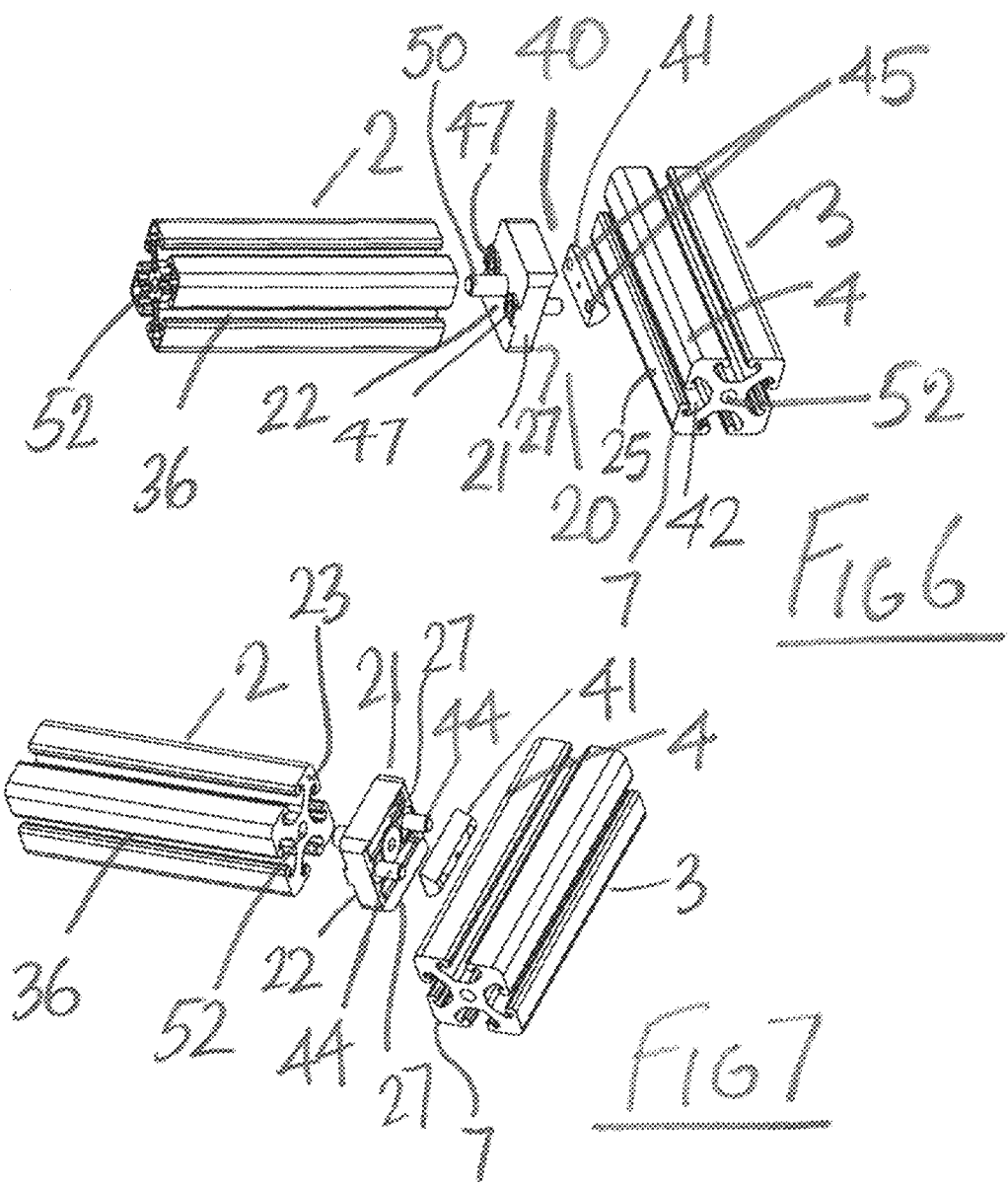

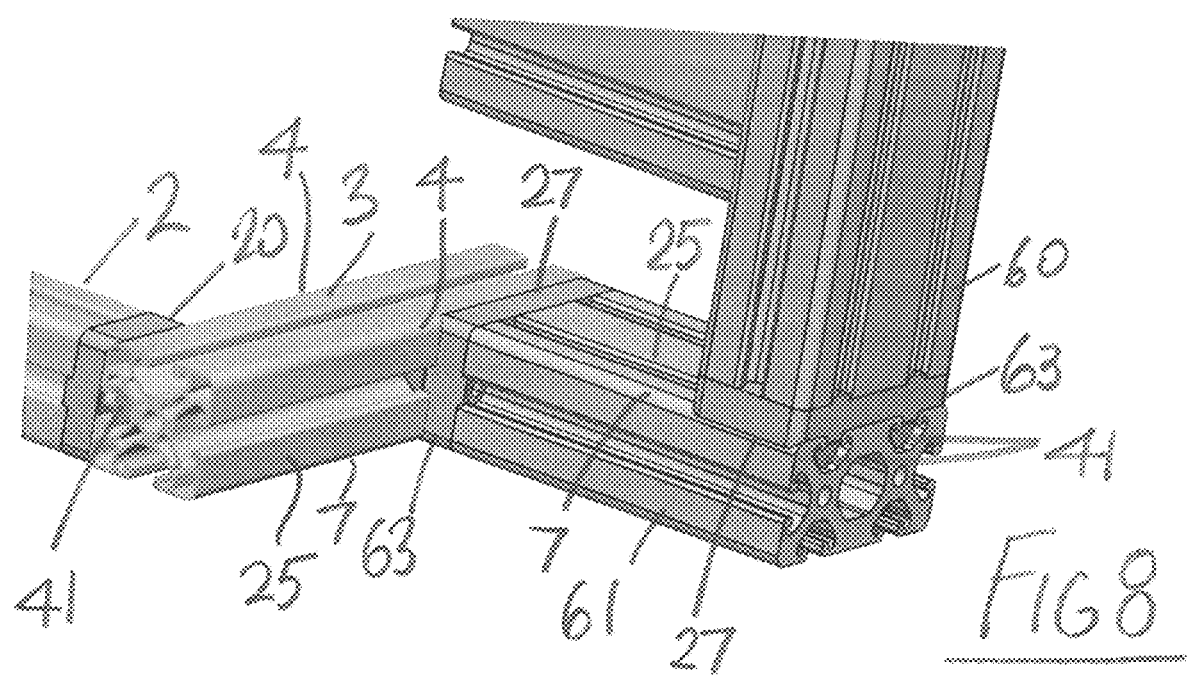

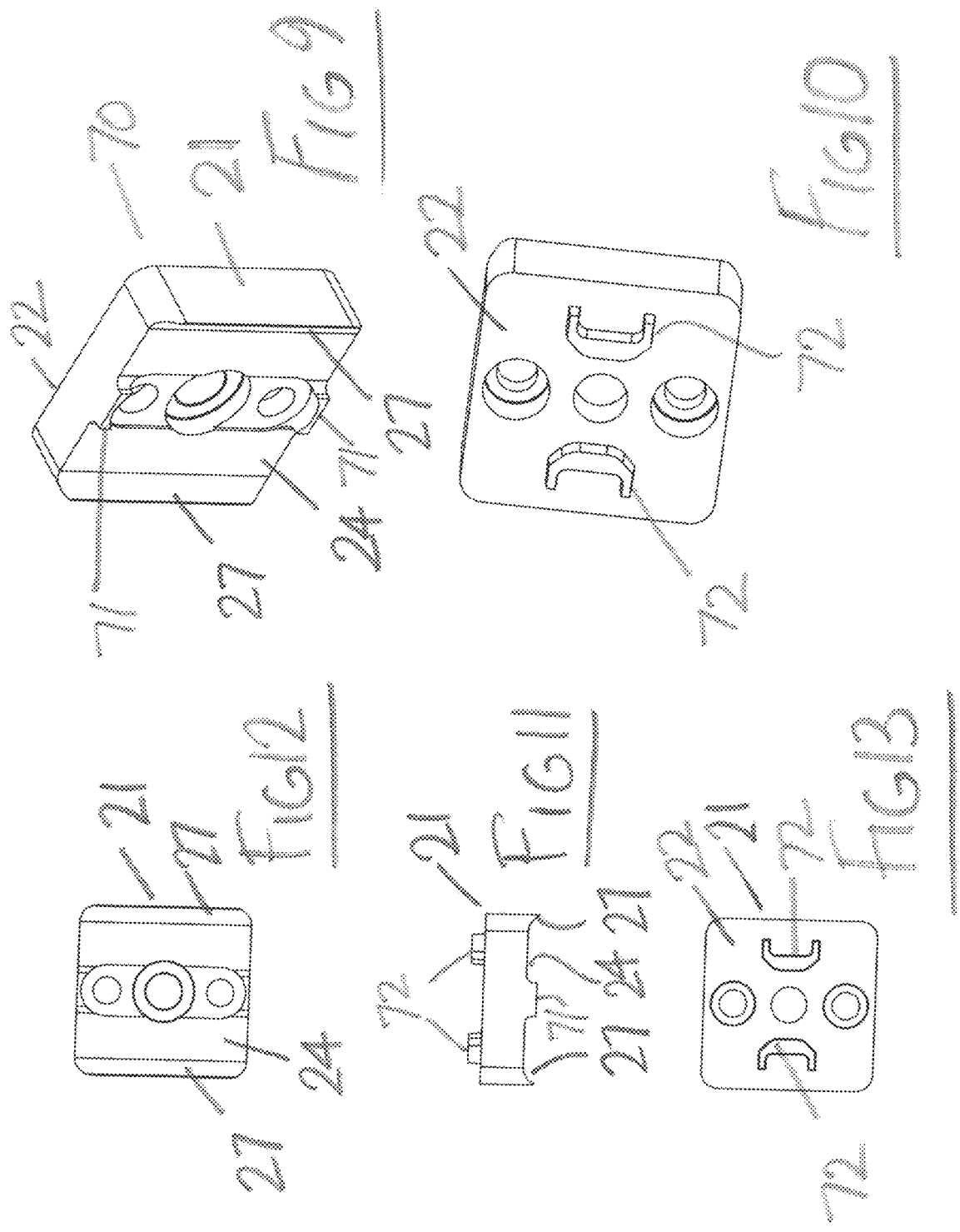

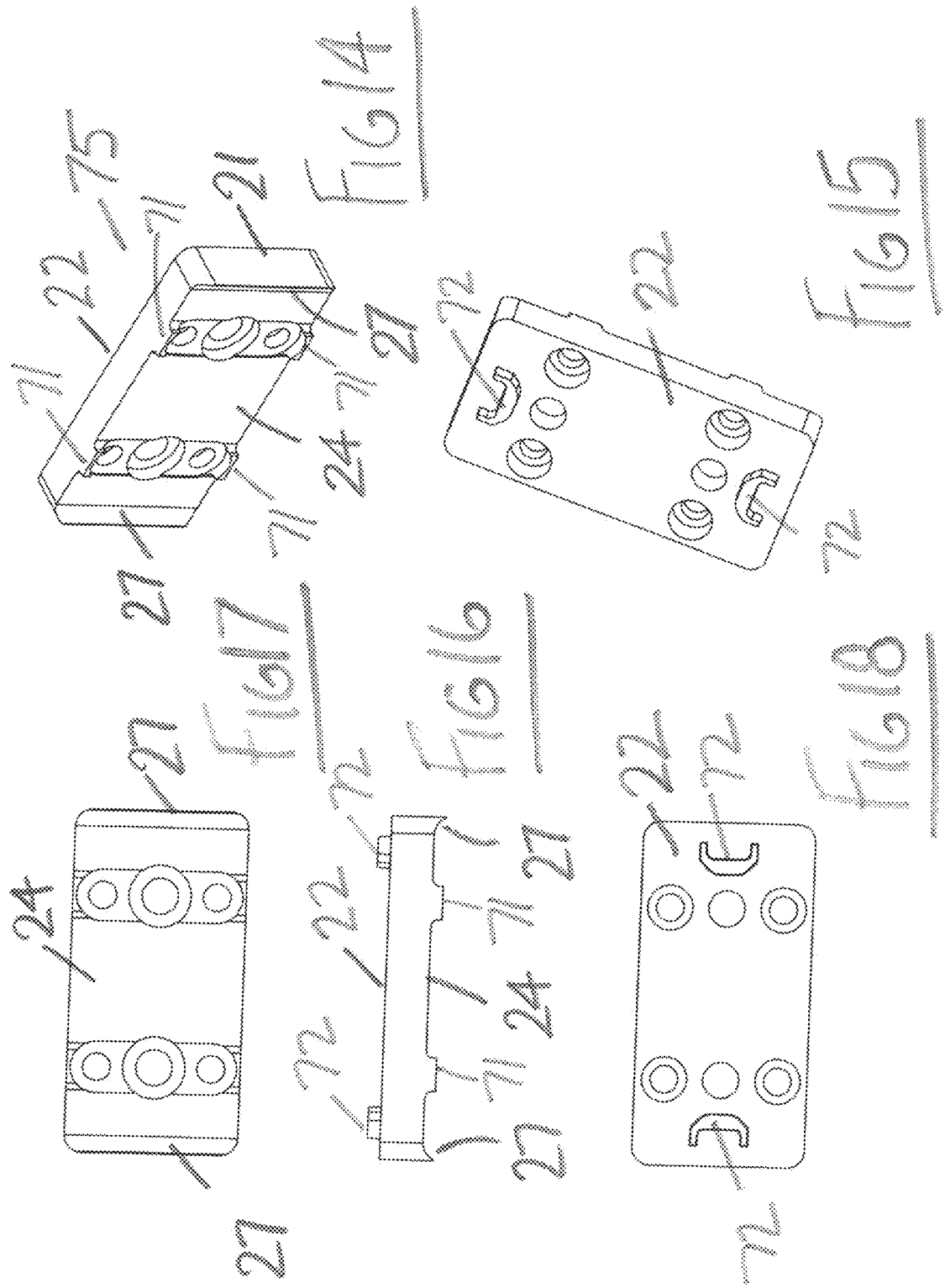

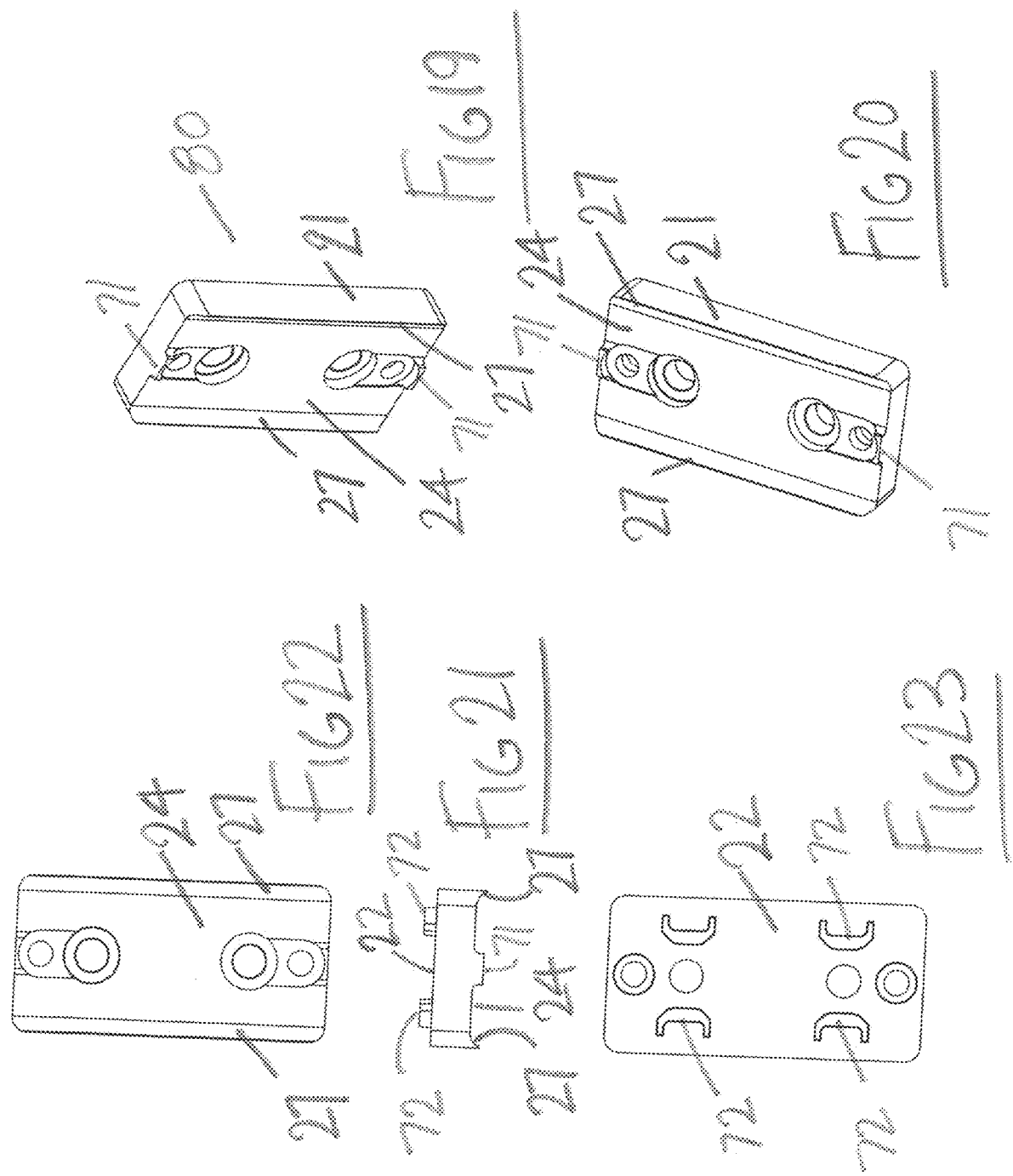

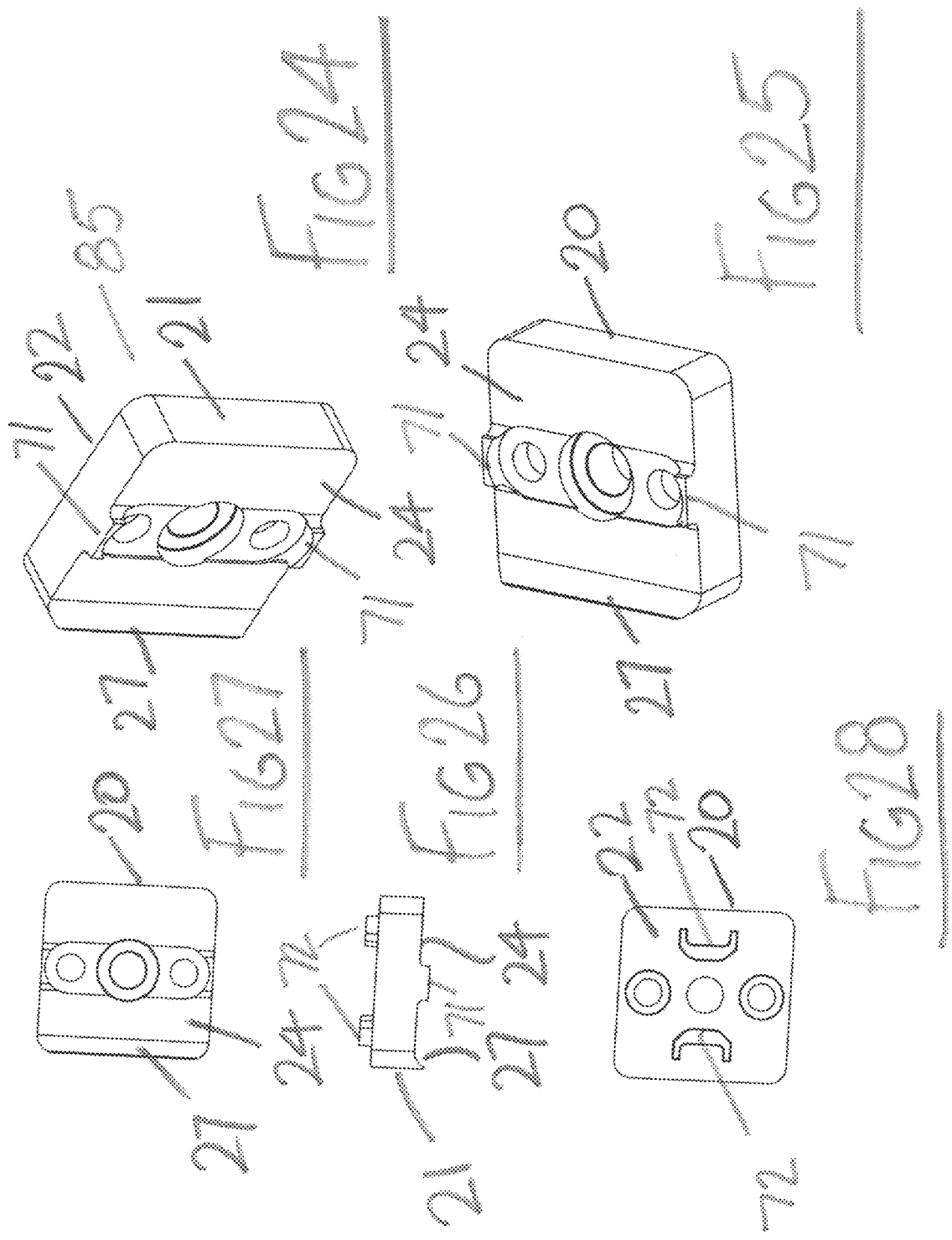

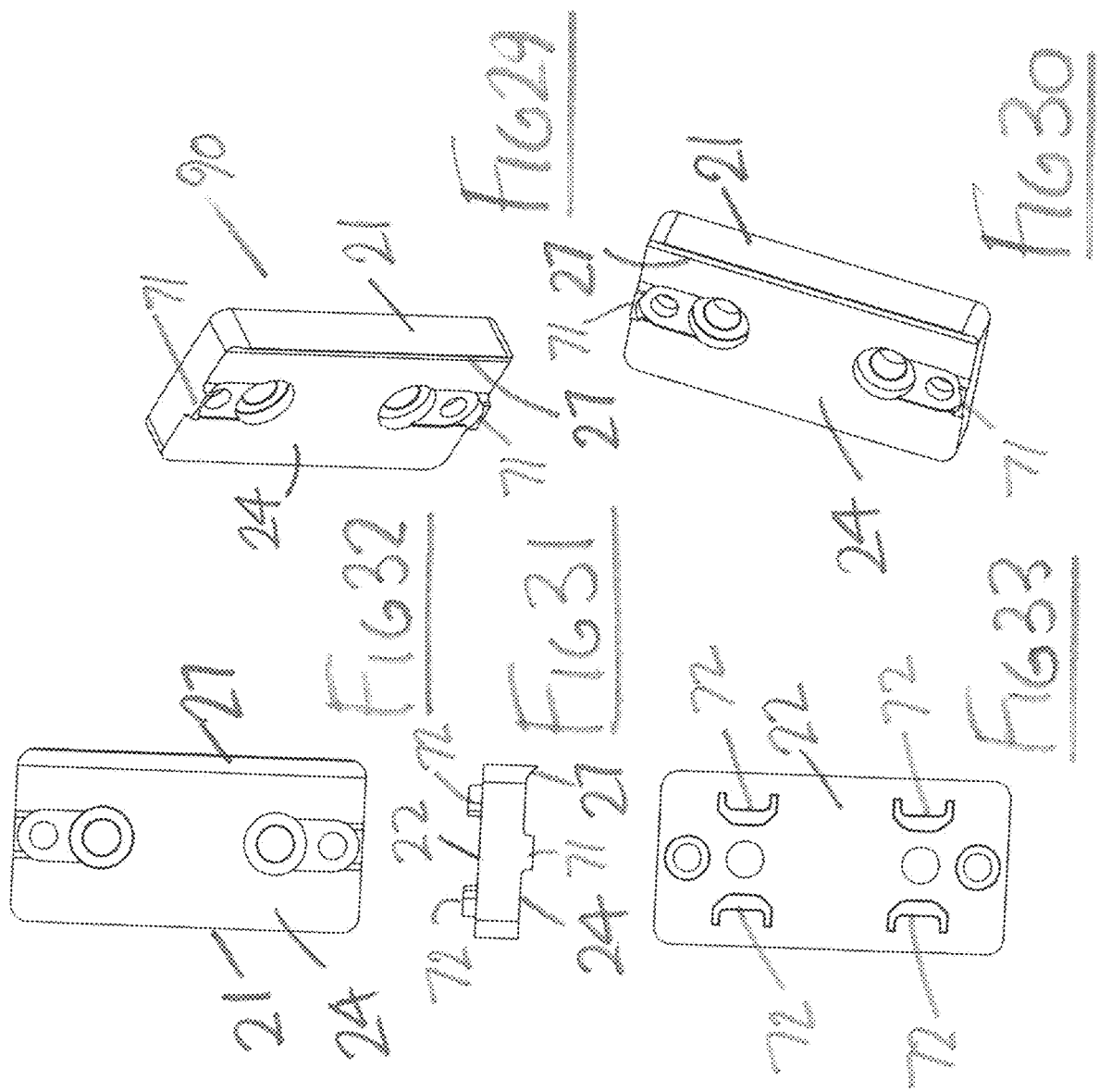

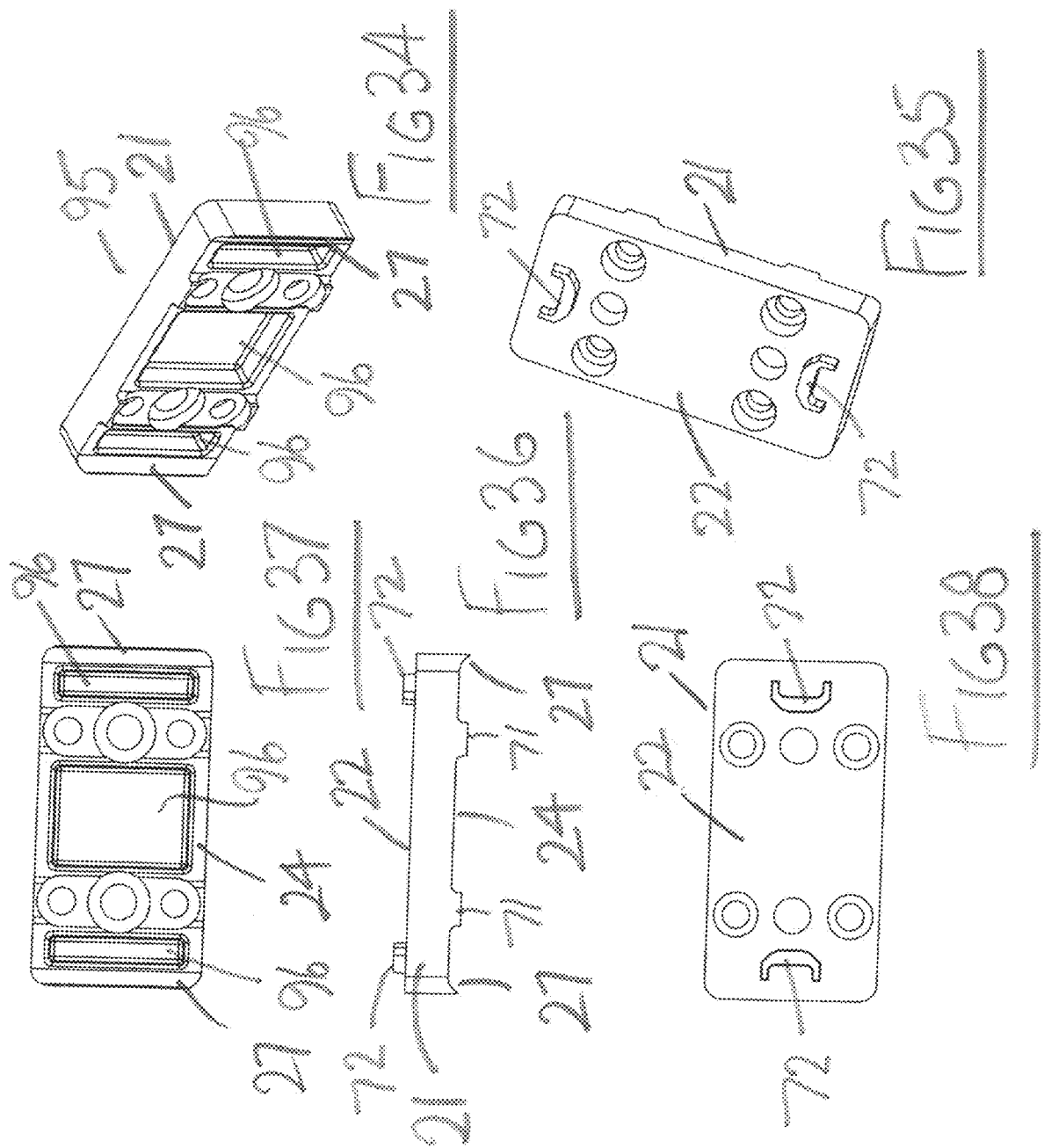

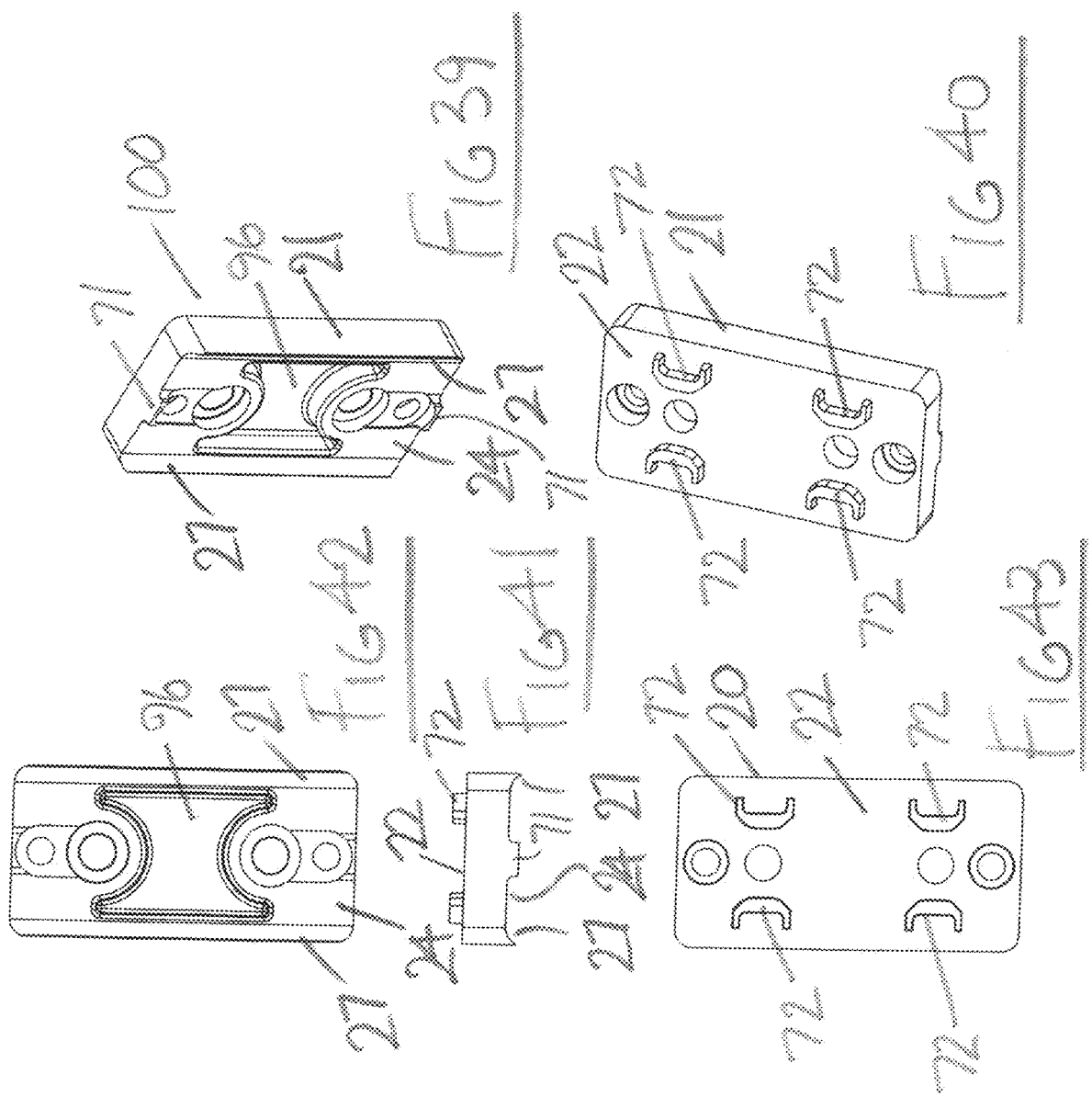

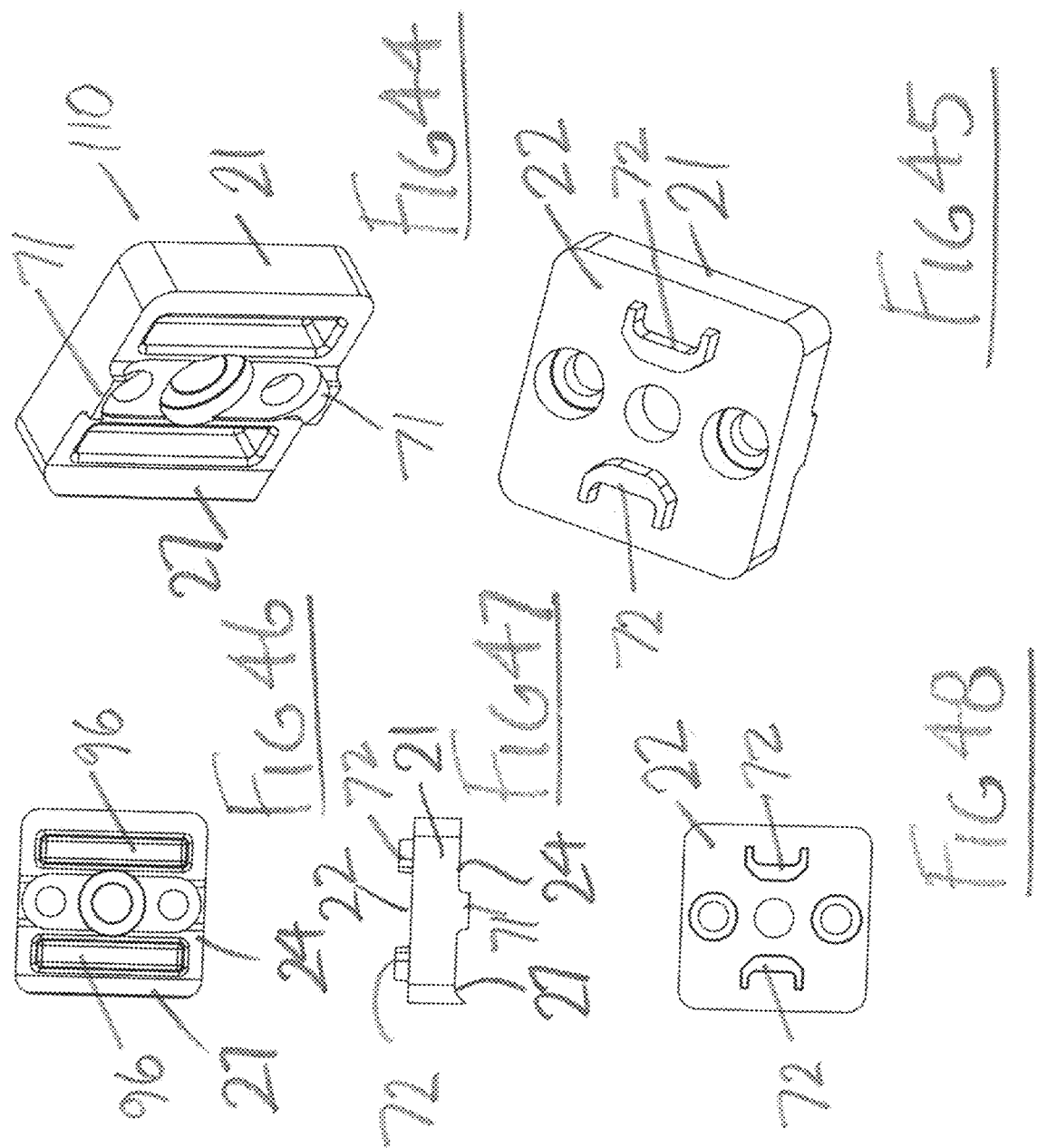

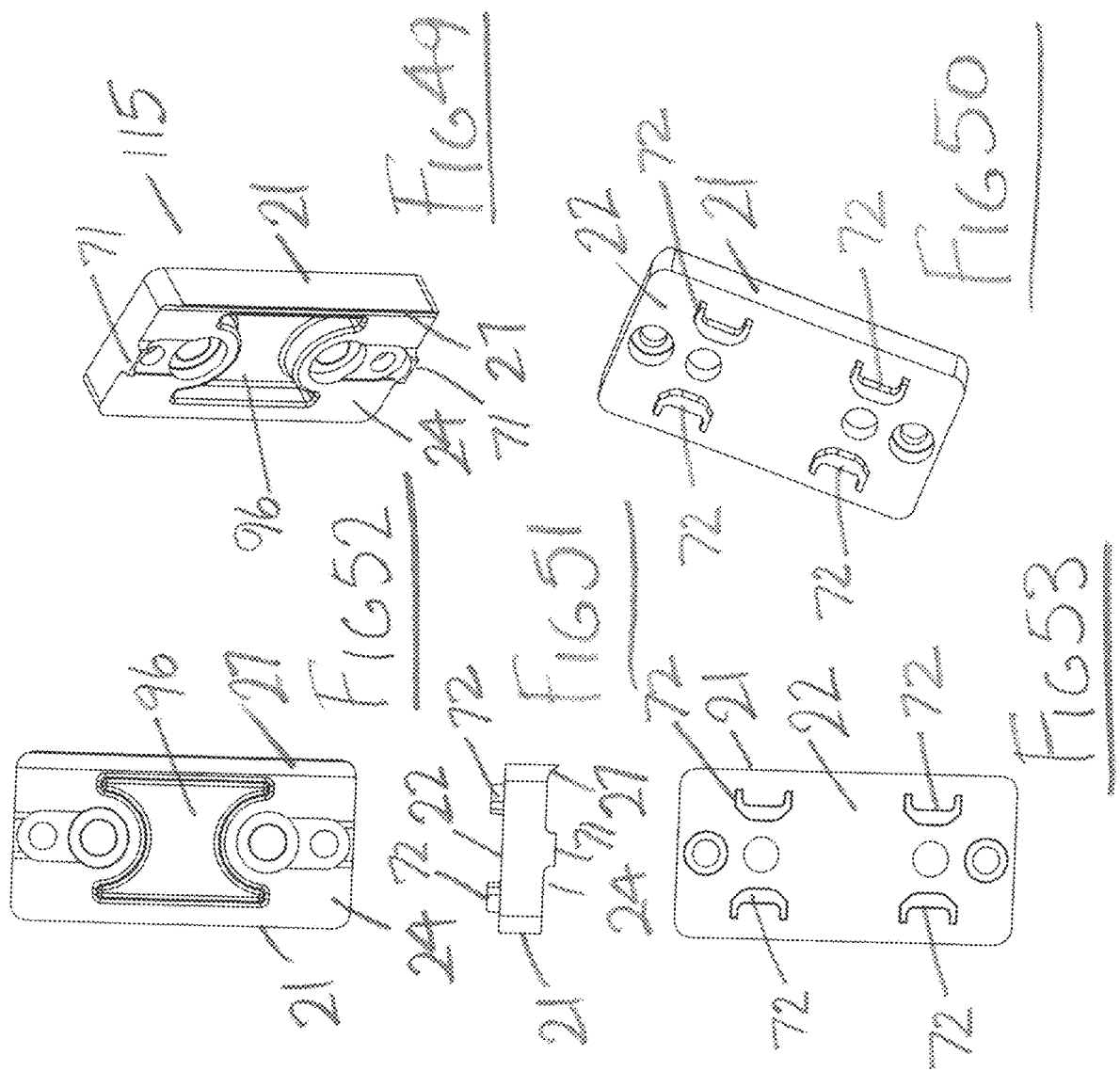

CONNECTOR

CROSS REFERENCE TO RELATED APPLICATIONS

This application claims priority to U.K. Application No. GB2001159.9 filed Jan. 28, 2020 entitled Connector which is incorporated in its entirety herein by reference thereto.

FEDERALLY SPONSORED RESEARCH AND DEVELOPMENT

None.

BACKGROUND OF THE INVENTION

1. Field of the Invention

This invention relates to a connector for attachment of frame elements.

2. Background

The invention particularly relates to aluminum profile machine framing. In FIG. 1 there is illustrated an aluminum profile machine framing system indicated generally by the reference numeral 1. The system 1 includes a plurality of frame elements, only two of which are illustrated, namely a first frame element 2 and a second frame element 3. Each frame element 2, 3 is of generally rectangular section having radiused side edges 4, 5, 6, 7. When the two frame elements 2, 3 are abutted as shown with an end face 8 of the first frame element 2 abutting against a side face 9 of the second frame element 3, a groove 10 forming a dirt trap is formed at opposite side edges of the frame elements 2, 3 due to the radiused edges 4, 7. Further, various connection methods are available for joining the two frame elements 2, 3 together. One connector system requires a hole to be precisely drilled in one frame element 2, 3 for key access. Another connection system requires a special tool and jig to drill holes in one or both frame elements 2, 3. A third system uses a complex and awkward "automatic" connector. These conventional connector systems make assembly of the framing system difficult and time consuming.

The present invention is directed towards overcoming these problems.

SUMMARY OF THE INVENTION

According to the invention, there is provided a connector for attachment of two frame elements, the frame elements being of rectangular section and having radiused side edges, the connector comprising a connector body of similar rectangular section to the frame elements having an inner flat engagement face for engagement with a flat end face of a first frame element to form an extension of the first frame element, and an outer engagement face substantially parallel to the inner engagement face for abutting engagement against a flat side wall of a second frame element, the outer engagement face having at least one outwardly projecting lip along a side edge, the lip having a curved inner face for mating engagement with a radiused edge of the second frame element and a flat outer face forming an extension of a side wall of the connector body to align with and provide a smooth transition between adjacent side walls of the two frame elements.

In another embodiment there is provided a connector for attachment of two frame elements, the frame elements being of rectangular section and having radiused side edges, the connector comprising a connector body of similar rectangular section to the frame elements, the connector body comprising a single piece block having an inner flat engagement face for engagement with a flat end face of a first frame element to form an extension of the first frame element, and an outer engagement face substantially parallel to the inner engagement face for abutting engagement against a flat side wall of a second frame element, the outer engagement face having at least one outwardly projecting lip along a side edge, the lip having a curved inner face for mating engagement with a radiused edge of the second frame element and a flat outer face forming an extension of a side wall of the connector body to align with and provide a smooth transition between adjacent side walls of the two frame elements, a locking element provided on the connector body which is engageable with a frame element to resist rotation of the connector body relative to the frame element, a fastener to secure the frame elements together, the fastener comprising an elongate slide block which is slidably engageable within a re-entrant slot in the second frame element and a pair of spaced-apart retaining screws which are engageable with the slide block and extend outwardly therefrom for engagement with the connector body to secure the slide block on the connector body, locating the slide block spaced-apart from the outer engagement face of the connector body.

In one embodiment of the invention the outer engagement face has two lips extending along opposite side edges of the connector body at the outer face.

In another embodiment of the invention a locking element is provided on the connector body which is engageable with a frame element to resist rotation of the connector body relative to the frame element.

In another embodiment of the invention the locking element comprises at least one locking tab which projects outwardly from the inner engagement face for complementary interengagement with an associated slot in the first frame element, or from the outer engagement face for complementary interengagement with an associated slot in the second frame element.

In another embodiment the locking element comprises locking tabs on both the inner engagement face and on the outer engagement face.

In another embodiment the locking tabs comprise a pair of locking tabs located at opposite sides of the connector body.

In another embodiment the locking tabs comprise a pair of spaced-apart locking tabs mounted on and projecting outwardly from the inner engagement face of the connector body.

In another embodiment the locking tabs comprise a pair of locking tabs located at opposite sides of the connector body at the outer engagement face and a pair of spaced-apart locking tabs mounted on and projecting outwardly from the inner engagement face of the connector body In another embodiment of the invention the connector includes a fastener to secure the frame elements together.

In another embodiment of the invention the fastener comprises a slide block which is slidably engageable within a re-entrant slot in the second frame element and at least one retaining screw which is engageable with the slide block and extends outwardly therefrom for engagement with the connector body to secure the slide block on the connector body, locating the slide block spaced-apart from the outer face of the connector body.

In another embodiment of the invention a pair of spaced-apart retaining screws is provided on the slide block.

In another embodiment of the invention a retaining washer associated with each retaining screw is mounted on the connector body at the outer face, the retaining washer having a central through-hole for reception and through-passage of the retaining screw which is an interference fit in the through-hole for gripping the retaining screw. In another embodiment slots are provided in the outer face of the connector body for reception of each retaining washer.

In another embodiment the retaining washer is a push fit into the slot to hold the retaining washer in the slot.

In another aspect, the invention provides a fastener assembly comprising a screw fastener and an associated retaining washer, the retaining washer having a central through hole for reception and through passage of the screw fastener which is an interference fit in the through hole for gripping the screw fastener.

BRIEF DESCRIPTION OF THE DRAWINGS

The invention will be more clearly understood by the following description of some embodiments thereof, given by way of example only, with reference to the accompanying drawings.

FIG. 6 is an exploded perspective view showing the connector and the associated two frame elements.

FIG. 7 is a further exploded perspective view of the connector and the associated frame elements.

FIG. 8 is a detail perspective view showing various connectors of the invention in use interconnecting several different types of frame element.

FIGS. 9 to 13 are various views of a connector according to a further embodiment of the invention.

FIGS. 14 to 18 are various views illustrating another connector according to the invention.

FIGS. 19-23 are various views showing a further connector according to the invention.

FIGS. 24 to 28 are various views showing a further connector according to the invention.

FIGS. 29 to 33 are various views showing another connector according to the invention.

FIGS. 34 to 38 are various views of another connector according to the invention.

FIGS. 39 to 43 are various views of another connector according to the invention.

FIGS. 44 to 48 are various views of another connector according to the invention.

FIGS. 49 to 53 are various views showing another connector according to the invention.

DETAILED DESCRIPTION OF THE INVENTION

Figure 1:
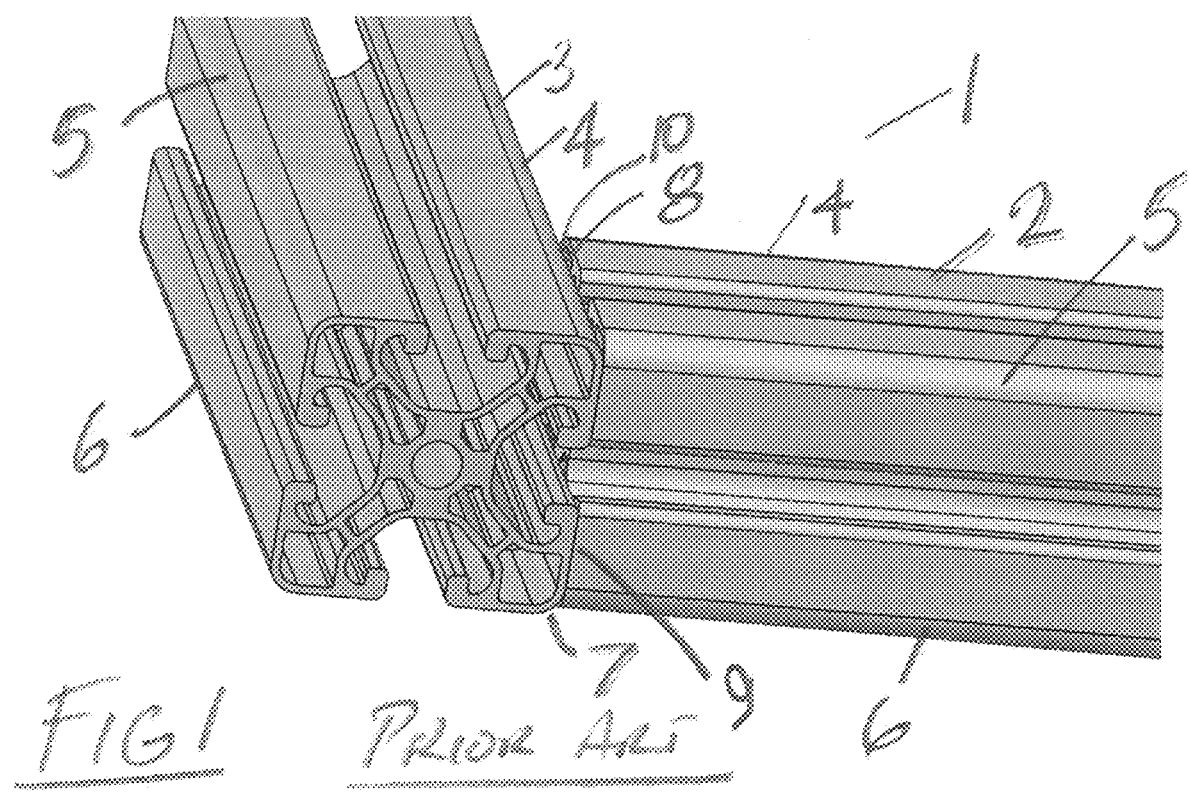
FIG. 1 is a perspective view of a prior art frame system.
Figure 2:
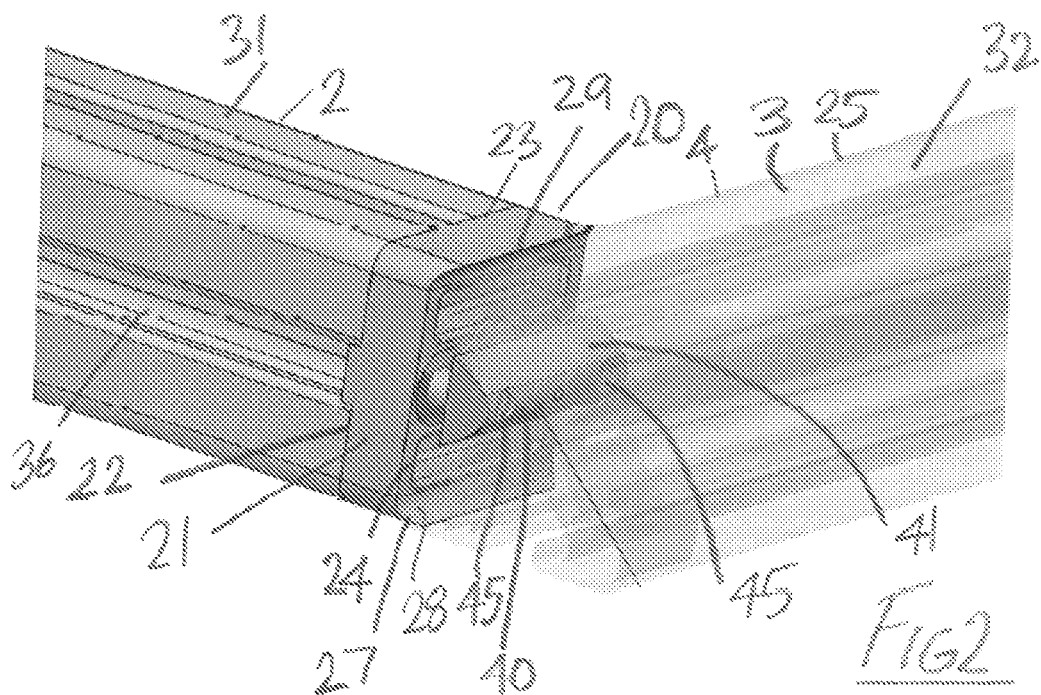
FIG. 2 is a perspective view showing a connector of the invention in use interconnecting two frame elements.
Figure 3:
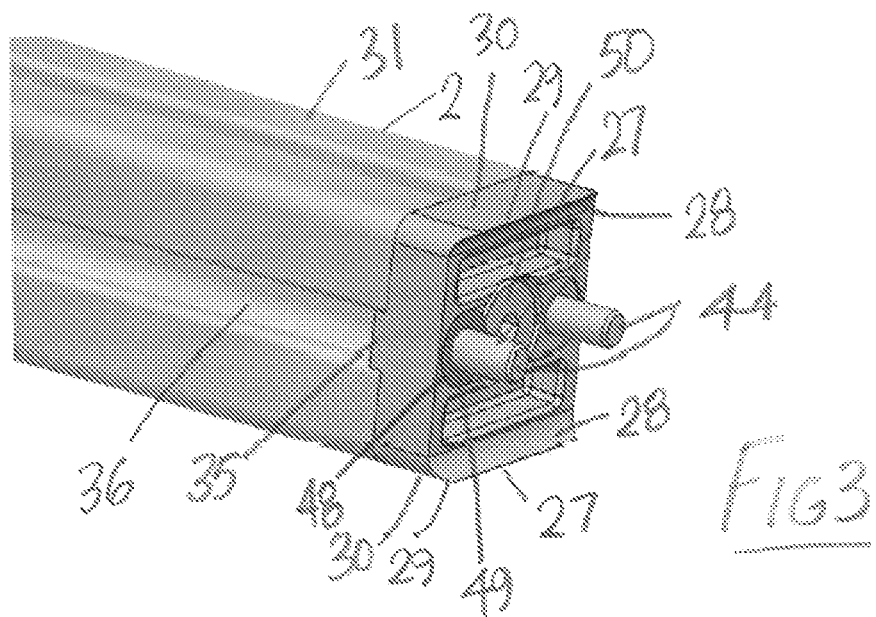
FIG. 3 is another perspective view of the connector shown mounted on one of the frame elements.
Figure 4:
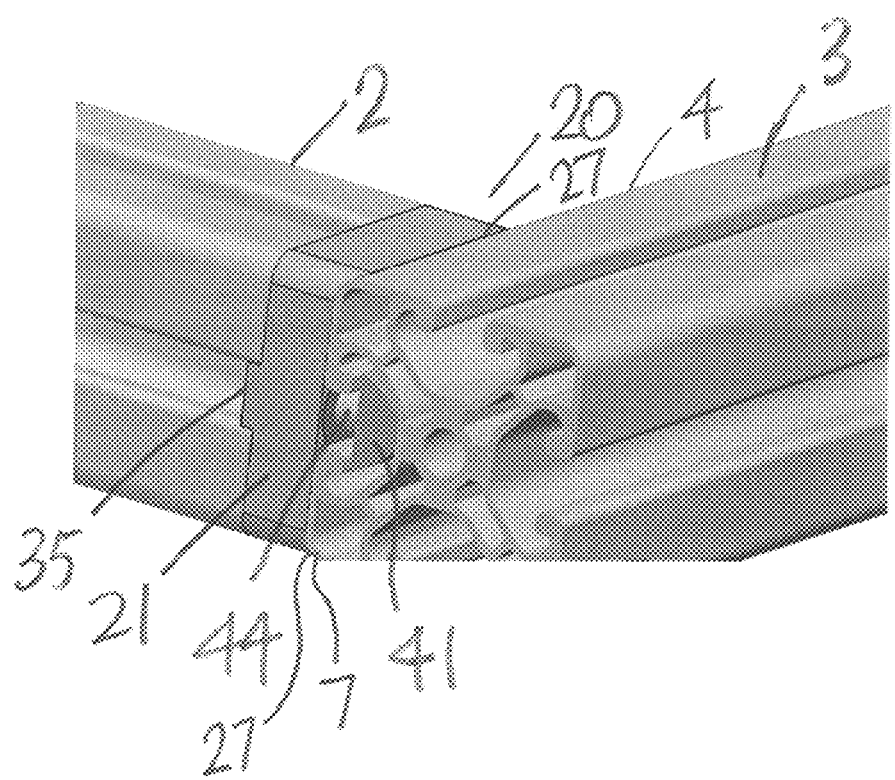
FIG. 4 is another perspective view showing the connector in use interconnecting the two frame elements.
Figure 5:
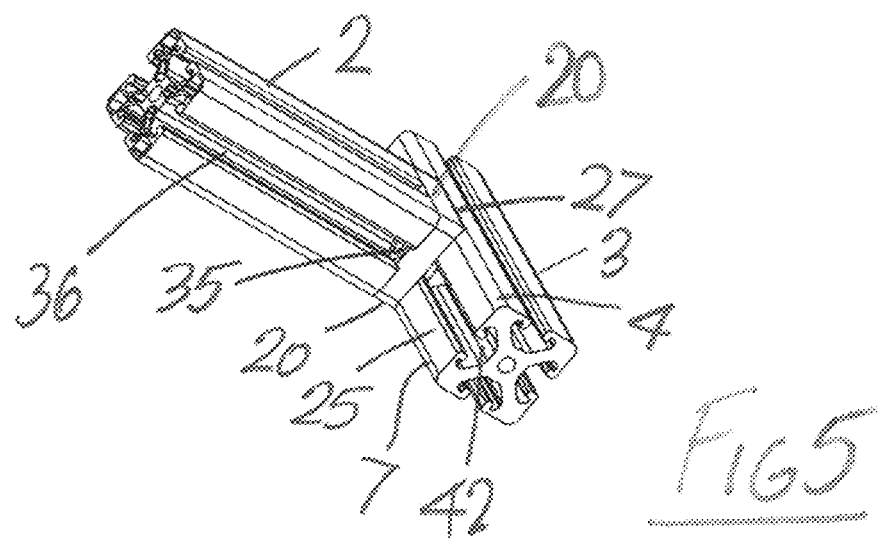
FIG. 5 is a further perspective view of the connector in use.

Referring to FIG. 2 to FIG. 7, there is illustrated a connector according to the invention indicated generally by the reference numeral 20. Parts similar to those described previously are assigned the same reference numerals. The connector 20 has a connector body 21 of similar rectangular section to the frame elements 2, 3. A flat inner engagement face 22 of the connector body 21 engages with a flat end face 23 of the first frame element 2, and essentially forms an extension of the first frame element 2 as shown in FIGS. 2 and 3.

An outer engagement face 24 of the connector body 21 is substantially parallel to the inner engagement face 22 and in use abuts against a flat side wall 25 of the second frame element 3. The outer engagement face 24 has two outwardly projecting lips 27 along opposite side edges of the connector body 21 at the outer face 24. Each lip 27 has a curved inner face 28 for engagement with opposed radiused edges 4, 7 at opposite sides of the flat side wall face 25 of the second frame element 3. A flat outer face 29 of the lip 27 forms an extension of a side wall 30 of the connector body 21 and provides a smooth transition between adjacent side walls 31, 32 of the two frame elements 2, 3. Thus, advantageously, there is no groove forming a dirt trap between the two frame elements 2, 3 when they are interconnected.

Locking tabs 35 project outwardly of the inner face 22 of the connector body 21 for complementary inter-engagement with associated slots 36 in opposite side walls of the first frame element 2. This locking inter-engagement of the connector 20 with the first frame element 2 prevents rotation of the connector 2 on the first frame element 2. The lips 27 on the outer face 24 of the connector body 21 prevent relative rotation between the connector 20 and the second frame element 3.

A fastener 40 is provided for securing the two frame elements 2, 3 together. The fastener 40 comprises a slide block 41 which is slidably engageable within an associated re-entrant slot 42 in the side wall 25 of the second frame element 3. A pair of spaced-apart retaining screws 44 are engageable with associated stepped through-holes 45 in the mounting block 41 and extend outwardly therefrom for engagement with associated mounting holes 47 in the connector body 21 to secure the slide block 41 on the connector body 21, locating the slide block 41 spaced-apart from the outer face 24 of the connector body 21 as can be seen in FIG. 2.

Optionally, retaining washers 48 associated with each retaining screw 44 are mounted on the connector body 21 at the outer face 24. Slots may be provided in the outer face 24 for reception of each retaining washer 48, which conveniently may be a push fit into the slot to hold the retaining washer 48 in the slot. Each retaining washer 48 has a central through-hole 49 for reception and through-passage of the retaining screw 44 which is an interference fit in the through-hole 49 so that the retaining screw 44 is gripped by the retaining washer 48 and held in place during assembly for ease of construction of the framework. Each through-hole 49 is sized such that the screw 44 can simply be pushed into the through hole 49 which grips the screw 44 ready for the screw being tightened on the connector body 21.

A central mounting screw 50 is engageable through a central mounting hole in the connector body 21 and threadedly engages a central hole 52 in the first frame element 2 to secure the connector body 21 on the first frame element 2.

It will be appreciated that in use the connectors 20 of the invention are relatively easy to use and provide a secure connection between frame elements 2, 3. Furthermore, it avoids the formation of dust-collecting grooves between adjoining frame elements 2, 3 upon assembly of the framing system.

FIG. 8 shows an arrangement whereby a number of frame elements 2, 3, 60, 61 are interconnected. Parts similar to those described previously are assigned the same reference numerals. In this case both square section frame elements 2, 3 and rectangular section frame elements 60, 61 are provided. Matching connectors 63 are provided for the rectangular section frame elements 60, 61.

The remaining drawings all show various different configurations of connector with either a single lip 27 or double lip 27 on the outer face 24 of the various connectors shown. In the various connectors shown similar parts are assigned the same reference numerals.

FIGS. 9-13 show another connector 70 according to another embodiment of the invention. The connector body 21 is a square block connector body 21. In this case a pair of locking tabs 71 are provided at opposite sides of the connector body 21 projecting outwardly from the outer engagement face 24. In addition, a pair of spaced-apart C-shaped locking tabs 72 are mounted on and project outwardly from the inner engagement face 22.

FIGS. 14-18 show another connector 75 according to another embodiment of the invention. The connector body 21 is an elongate rectangular block connector body 21.

FIGS. 19-23 show another connector 80 according to another embodiment of the invention. The connector body 21 is an elongate rectangular block connector body 21.

FIGS. 24-28 show another connector 85 according to another embodiment of the invention. The connector body 21 is a square block connector body 21.

FIGS. 29-33 show another connector 90 according to another embodiment of the invention. The connector body 21 is an elongate rectangular block connector body 21.

FIGS. 34-38 show another connector 95 according to another embodiment of the invention. The connector body 21 is an elongate rectangular block connector body 21. In this case a number of spaced-apart voids 96 are provided in the connector body 21 extending inwardly from the outer engagement face 24 to reduce the amount of material required to form the connector body 21.

FIGS. 39-43 show another connector 100 according to another embodiment of the invention. The connector body 21 is an elongate rectangular block connector body 21. A single centrally located void 96 is provided in the outer engagement face 24.

FIGS. 44-48 show another connector 110 according to another embodiment of the invention. The connector body 21 is a square block connector body 21.

FIGS. 49-53 show another connector 115 according to another embodiment of the invention. The connector body 21 is an elongate rectangular block connector body 21.

The terms "comprise" and "include", and any variations thereof required for grammatical reasons, are to be considered as interchangeable and accorded the widest possible interpretation.

The invention is not limited to the embodiments hereinbefore described which may be varied in both construction and detail within the scope of the appended claims.

What is claimed is:

1. A connector for attachment of two frame elements, the frame elements being of rectangular section and having radiused side edges, the connector comprising:
    a connector body of similar rectangular section to the frame elements, the connector body comprising a single piece block having an inner flat engagement face for engagement with a flat end face of a first frame element to form an extension of the first frame element, and an outer engagement face substantially parallel to the inner flat engagement face for abutting engagement against a flat side wall of a second frame element, the outer engagement face having at least one outwardly projecting lip along a side edge, the lip having a curved inner face for mating engagement with a radiused outer edge of the second frame element and a flat outer face forming an extension of a side wall of the connector body to align with and provide a smooth transition between adjacent side walls of the two frame elements;
    a locking element provided on the connector body which is engageable with an associated slot in the first or second frame element to resist rotation of the connector body relative to the frame element;
    a fastener to secure the frame elements together, the fastener comprising a single elongate slide block which is slidably engageable within a re-entrant slot in the second frame element and a pair of spaced-apart retaining screws which are engageable with an associated pair of spaced-apart through holes in the single elongate slide block, the pair of spaced-apart retaining screws extending outwardly from the single elongate slide block for engagement with associated mounting holes in the connector body to secure the single elongate slide block on the connector body, locating the single elongate slide block spaced-apart from the outer engagement face of the connector body;
    an annular retaining washer associated with each retaining screw being mounted on the connector body at the outer engagement face, the retaining washer having a central through-hole for reception and through-passage of the retaining screw which is an interference fit in the through-hole for gripping the retaining screw, such that the retaining screw is gripped by the retaining washer and held in place during assembly, each through-hole being sized such that the retaining screw can simply be pushed into the through hole which grips the retaining screw ready for the retaining screw being tightened on the connector body; and
    slots being provided in the outer engagement face of the connector body for reception of each retaining washer, each retaining washer being a push fit into the slot to hold the retaining washer in the slot.

2. The connector as claimed in claim 1, wherein the outer engagement face has two lips extending along opposite side edges of the connector body at the outer engagement face.

3. The connector as claimed in claim 1, wherein the locking element comprises at least one locking tab which projects outwardly from the inner flat engagement face for complementary interengagement with an associated slot in the first frame element, or from the outer engagement face for complementary interengagement with an associated slot in the second frame element.

4. The connector as claimed in claim 3, wherein the locking element comprises locking tabs on both the inner flat engagement face and on the outer engagement face.

5. The connector as claimed in claim 3, wherein the locking tabs comprise a pair of locking tabs located at opposite sides of the connector body at the outer engagement face and a pair of spaced-apart locking tabs mounted on and projecting outwardly from the inner flat engagement face of the connector body.

6. The connector as claimed in claim 3, wherein the locking tabs comprise a pair of locking tabs located at opposite sides of the connector body.

7. The connector as claimed in claim 3, wherein the locking tabs comprise a pair of spaced-apart locking tabs mounted on and projecting outwardly from the inner flat engagement face of the connector body.

8. A connector for attachment of two frame elements, the frame elements being of rectangular section and having radiused side edges, the connector comprising:
- a connector body of similar rectangular section to the frame elements, the connector body comprising a single piece block having an inner flat engagement face for engagement with a flat end face of a first frame element to form an extension of the first frame element, and an outer engagement face substantially parallel to the inner flat engagement face for abutting engagement against a flat side wall of a second frame element, the outer engagement face having at least one outwardly projecting lip along a side edge, the lip having a curved inner face for mating engagement with a radiused outer edge of the second frame element and a flat outer face forming an extension of a side wall of the connector body to align with and provide a smooth transition between adjacent side walls of the two frame elements, the inner face of the lip being curved between an inner end and an outer end of the inner face of the lip;
- a locking element provided on the connector body which is engageable with an associated slot in the first or second frame element to resist rotation of the connector body relative to the frame element;
- a fastener to secure the frame elements together, the fastener comprising a single elongate slide block which is slidably engageable within a re-entrant slot in the second frame element and a pair of spaced-apart retaining screws which are engageable with an associated pair of spaced-apart through holes in the single elongate slide block, the pair of spaced-apart retaining screws extending outwardly from the single elongate slide block for engagement with associated mounting holes in the connector body to secure the single elongate slide block on the connector body, locating the single elongate slide block spaced-apart from the outer engagement face of the connector body;
- an annular retaining washer associated with each retaining screw being mounted on the connector body at the outer engagement face, the retaining washer having a central through-hole for reception and through-passage of the retaining screw which is an interference fit in the through-hole for gripping the retaining screw, such that the retaining screw is gripped by the retaining washer and held in place during assembly, each through-hole being sized such that the retaining screw can simply be pushed into the through hole which grips the retaining screw ready for the retaining screw being tightened on the connector body; and
- slots being provided in the outer engagement face of the connector body for reception of each retaining washer, each retaining washer being a push fit into the slot to hold the retaining washer in the slot.

9. A connector for attachment of two frame elements, the frame elements being of rectangular section and having radiused side edges, the connector comprising:
- a connector body of similar rectangular section to the frame elements, the connector body comprising a single piece block having an inner flat engagement face for engagement with a flat end face of a first frame element to form an extension of the first frame element, and an outer engagement face substantially parallel to the inner flat engagement face for abutting engagement against a flat side wall of a second frame element, the outer engagement face having at least one outwardly projecting lip along a side edge, the lip having a curved inner face for mating engagement with a radiused outer edge of the second frame element and a flat outer face forming an extension of a side wall of the connector body to align with and provide a smooth transition between adjacent side walls of the two frame elements, the inner face of the lip being curved between an inner end and an outer end of the inner face of the lip, the lip terminating in a pointed tip formed between the outer end of the inner face of the lip and an outer end of the outer face of the lip;
- a locking element provided on the connector body which is engageable with an associated slot in the first or second frame element to resist rotation of the connector body relative to the frame element;
- a fastener to secure the frame elements together, the fastener comprising a single elongate slide block which is slidably engageable within a re-entrant slot in the second frame element and a pair of spaced-apart retaining screws which are engageable with an associated pair of spaced-apart through holes in the single elongate slide block, the pair of spaced-apart retaining screws extending outwardly from the single elongate slide block for engagement with associated mounting holes in the connector body to secure the single elongate slide block on the connector body, locating the single elongate slide block spaced-apart from the outer engagement face of the connector body;
- an annular retaining washer associated with each retaining screw being mounted on the connector body at the outer engagement face, the retaining washer having a central through-hole for reception and through-passage of the retaining screw which is an interference fit in the through-hole for gripping the retaining screw, such that the retaining screw is gripped by the retaining washer and held in place during assembly, each through-hole being sized such that the retaining screw can simply be pushed into the through hole which grips the retaining screw ready for the retaining screw being tightened on the connector body; and
- slots being provided in the outer engagement face of the connector body for reception of each retaining washer, each retaining washer being a push fit into the slot to hold the retaining washer in the slot.

\* \* \* \* \*